United States Patent
Walsten et al.

[11] Patent Number: 5,820,249
[45] Date of Patent: Oct. 13, 1998

[54] APPARATUS AND METHOD FOR LOCATING A FISH TAPE

[75] Inventors: Dean R. Walsten, Slinger; Joseph M. Kampschroer, Whitefish Bay, both of Wis.

[73] Assignee: Applied Power Inc., Butler, Wis.

[21] Appl. No.: 691,622

[22] Filed: Aug. 2, 1996

[51] Int. Cl.$^6$ .............................. F21L 7/00; B25B 23/18
[52] U.S. Cl. ......................... 362/191; 362/119; 362/120; 362/190; 362/800
[58] Field of Search ..................... 362/190, 191, 362/800, 157, 208, 119, 120; 254/134.3 FT, 134.3 R

[56] References Cited

U.S. PATENT DOCUMENTS

| | | | |
|---|---|---|---|
| 1,877,077 | 9/1932 | Stevens | 362/157 |
| 3,824,731 | 7/1974 | Sandschaper | 43/17.5 |
| 3,918,191 | 11/1975 | Williamson | 362/191 |
| 4,039,142 | 8/1977 | Smith | 254/134.3 FT |
| 4,183,076 | 1/1980 | Bodde | 362/191 |
| 4,220,983 | 9/1980 | Schroeder | 362/800 |
| 4,306,277 | 12/1981 | Bodde | 362/120 |
| 4,327,401 | 4/1982 | Siiberg | 362/191 |
| 4,417,299 | 11/1983 | Rupp | 362/191 |
| 4,420,796 | 12/1983 | Mori | 362/32 |
| 4,480,295 | 10/1984 | Shuster | 362/191 |
| 4,481,561 | 11/1984 | Lanning | 362/191 |
| 4,699,485 | 10/1987 | Lippman et al. | 354/63 |
| 4,895,221 | 1/1990 | Carlson | 254/134.3 FT |
| 4,917,362 | 4/1990 | Wilson | 254/139.3 |
| 5,058,900 | 10/1991 | Denen | 362/119 |
| 5,070,437 | 12/1991 | Roberts, Sr. | 362/396 |
| 5,083,249 | 1/1992 | Chen | 362/191 |
| 5,152,598 | 10/1992 | Schaffer | 362/120 |
| 5,163,752 | 11/1992 | Copeland et al. | 362/191 |
| 5,179,797 | 1/1993 | Edwards et al. | 362/191 |
| 5,228,507 | 7/1993 | Obrejanu et al. | 166/98 |
| 5,268,826 | 12/1993 | Greene | 362/191 |
| 5,303,133 | 4/1994 | Wagner | 362/157 |
| 5,310,294 | 5/1994 | Perkins | 254/134.3 FT |
| 5,333,227 | 7/1994 | Ishiharada et al. | 385/100 |
| 5,440,297 | 8/1995 | Bright | 340/686 |
| 5,505,432 | 4/1996 | Noonan | 254/134.3 |
| 5,570,949 | 11/1996 | Chiang | 362/157 |
| 5,573,329 | 11/1996 | Van Gennep | 362/191 |
| 5,611,615 | 3/1997 | Jang | 362/119 |

FOREIGN PATENT DOCUMENTS

| 5495 | 11/1979 | European Pat. Off. | 254/134.3 FT |
|---|---|---|---|

OTHER PUBLICATIONS

Applicant's Exhibit A, photocopy of archery sight light including blister pack of Cobra Manufacturing Co., Inc., P.O. Box 667, Bixby, OK 74008.

*Primary Examiner*—Sandra L. O'Shea
*Assistant Examiner*—Matthew J. Spark
*Attorney, Agent, or Firm*—Quarles & Brady

[57] ABSTRACT

A fish tape locator has a first threaded end for fixing to the end of a fish tape and an opposite second end which emits light to help locate the end of the fish tape when it is being fished through a blind space. The first end is provided with a cross-bore for connecting the locator to a string, chain, hook or other line.

6 Claims, 1 Drawing Sheet

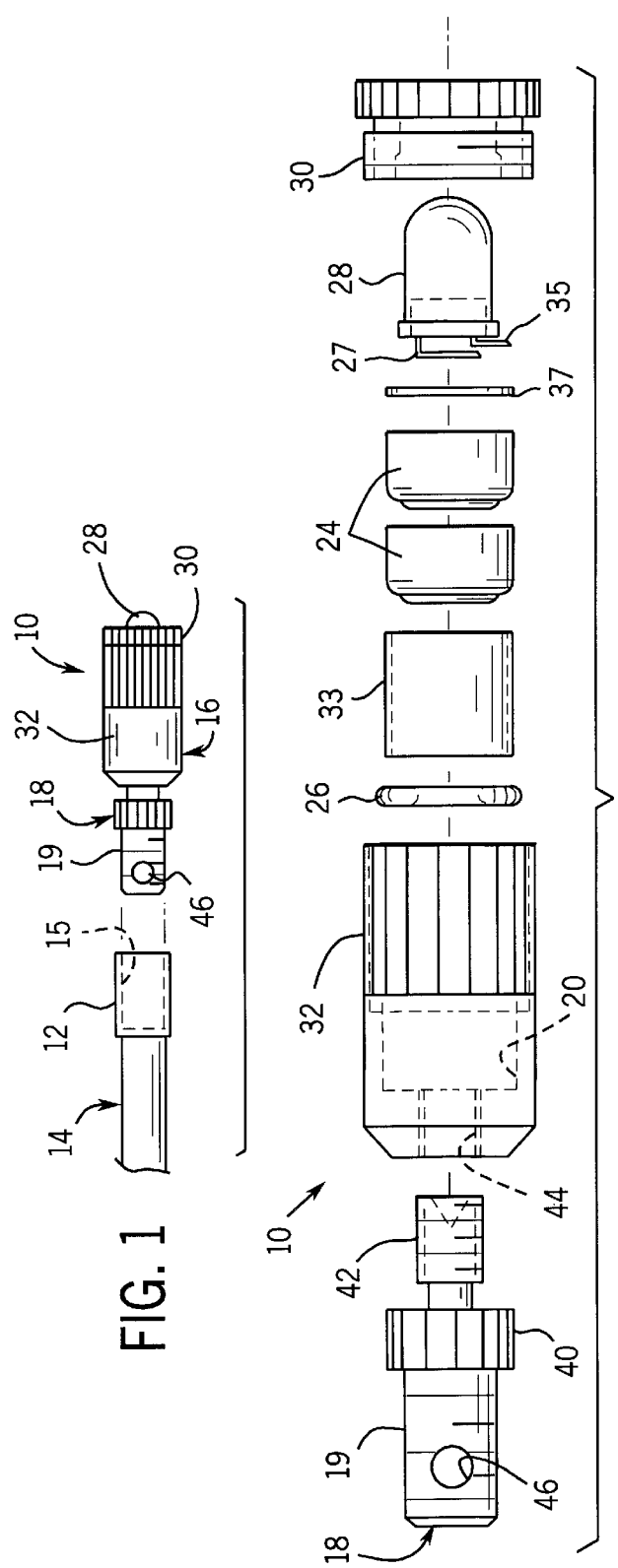
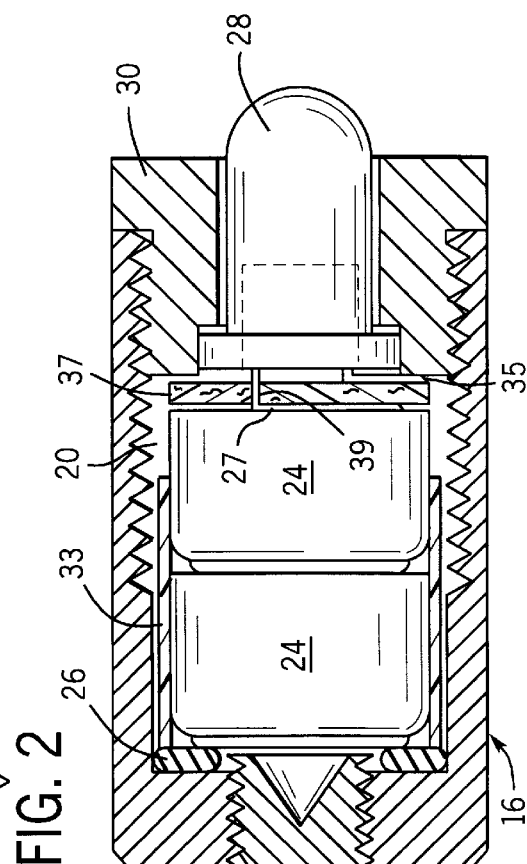

APPARATUS AND METHOD FOR LOCATING A FISH TAPE

BACKGROUND OF THE INVENTION

1. Field of the Invention

This invention relates to fish tapes and in particular to an apparatus and method for helping to locate the end of a fish tape after it is fished through a confined space such as a wall.

2. Discussion of the Prior Art

Fish tapes are well-known in the electrical industry and are typically a wire or flat strip, known as the tape, provided on a reel, which may be manually or automatically wound and unwound. The tape can be pushed through a blind space to the other end of the space, where it is located and attached to one or more wires to be pulled back through the space. Fish tapes typically have a hook or threads at their end which facilitates attaching the wires to the end. The fish tape with the wires attached is then pulled back through the space to feed the wires through the space.

When a fish tape is fished through a blind space, finding the end of the fish tape, i.e. where it comes out, can be a problem. Sometimes the fish tape is used to fish through a wall or other space where the person using the fish tape is probing around, without knowing exactly where the end of the fish tape will come out. Since by definition these spaces are confined and usually dark, it is difficult or impossible to see into them without destroying the surrounding structure, so finding the end of the fish tape can be difficult. The present invention is directed at a solution to this problem.

SUMMARY OF THE INVENTION

The present invention provides an apparatus and method of locating the end of a fish tape in a confined space in which a fish tape locator is connected to an end of the fish tape to illuminate the space in which the end of the fish tape is fished. A locator of the invention has a housing with a first end for connection to the end of the fish tape, the housing enclosing a power source and having means for mounting an ilumination device powered by said power source to emit light out a second end of the housing which is opposite from the first end. An illumination device is mounted in the housing to emit light from the first end of the housing when it is turned on, so as to be highly visible when fishing the end of the fish tape through the space.

In preferred aspects, the illumination device is an LED, the first end is provided with male threads for securing it to an end of a fish tape and the first end is provided with a cross-bore for suspending it from a string, chain or hook. These aspects make the locator especially useful for its intended purpose, since the LED can extend beyond the end of the housing for wide angle illumination, fish tapes commonly have female threaded ends, and strings chains, and hooks are readily available and commonly found in electrician's tool collections. In another aspect, the locator is turned on by screwing the first end into the housing to complete the circuit between the ilumination device and the power source, which yields a compact and efficient design.

These and other objects and advantages of the invention will be apparent from the detailed description and drawings.

BRIEF DESCRIPTION OF THE DRAWINGS

FIG. 1 illustrates a side plan view of a fish tape locator of the invention, shown together with the end of a fish tape;

FIG. 2 is an exploded plan view of the fish tape locator of FIG. 1; and

FIG. 3 is an assembly cross-sectional view of the fish tape locator of FIG. 1.

DETAILED DESCRIPTION OF THE PREFERRED EMBODIMENT

FIG. 1 illustrates a fish tape locator 10 of the invention, illustrated together with the female threaded end 12 of a fish tape 14. Locator 10 has a generally cylindrical housing 16 with an end 18 provided with male threads 19 to engage the female threads 15 in end 12 of the fish tape 14.

Housing 16 also defines at its end opposite from its threaded end 18 a battery compartment 20. In the battery compartment 20, a power source consisting of two pancake-type batteries 24 (e.g., each a 1.5 volt model #393 battery) in series is received, with an elastomeric o-ring spring 26 at the negative end of the left battery 24 biasing the batteries 24 against a contact 27 of an LED type lamp 28 that is received within a cover 30 of the housing 16. Cover 30, which is preferably knurled as shown, is threaded into body 32, also preferably knurled, of the housing 16. Sleeve 33, made of an electrically insulating material such as Teflon (tm), surrounds the positively charged casings of the batteries 24 to keep them insulated from the housing 16.

Lamp 28 extends beyond the end of cover 30 so that it is visible from and emits light to a wide viewing angle out the front of the locator 10. Contact 27, which is in contact with the positive end of the right battery 24, is separated and insulated from contact 35 of the lamp 28 by insulator disc 37, which is made of an electrically insulating material such as fiberglas. Contact 35 of the lamp 28 is pressed against the left end of cover 30 by the disc 37 so that it makes electrical contact with the housing 16. The disc 37 has a hole 39 in it through which the contact 27 extends.

End 18 has a knurled portion 40 separating threads 19 from a reduced diameter male threaded portion 42. Portion 42 is threaded into a female threaded through-bore 44 at the end of body 32 which is opposite from the cover 30. The right, or inward, end of end 18 makes contact with the negative end of the left battery 24 when it is screwed in far enough, which completes the electrical circuit to turn the lamp 28 on. The lamp 28 is turned off by screwing the end 18 out of the body 32 far enough to break electrical contact between the end 18 and the batteries 24.

The locator 10 must be small enough so that it does not seriously hamper the use of the fish tape 14. It must be small enough to fit into spaces through which wires and cables are typically pulled, and through which fish tapes 14 are typically fished. Thus, it should be kept as small as possible.

In the preferred embodiment, batteries 24 are used to provide power for the lamp 28. However, other alternatives are possible. For example, the energy source producing the illuminating light may be created by a chemical or photo-sensitive means, by a different type of batteries, by more or less batteries, and may have a blinking type of operation rather then being continuously on as in the preferred embodiment. Also, the locator 10 need not necessarily be threaded onto the end of the fish tape, but could be secured by any suitable means, such as a clip, tape, a thread, or a ball and socket type connection.

In this regard, an alternate method of connecting the locator 10 to a fish tape or other device, e.g., a plumb line, string, chain, etc., is to provide a cross-bore 46 through the end 18. A string or wire may be threaded through the hole 46 to secure it to a fish tape or chain, or a plumb line or other string may be threaded through the hole 46 to secure the locator 10 to the string. The hole 46 may be used to secure the end of the fish tape directly if the end of the fish tape is provided with a hook, or a hook is screwed into the end of the fish tape. If a chain, plumb line or other similarly flexible line is used, the locator 10 may be suspended from the line using the weight of the locator 10 to help guide it into spaces which are desired to be illuminated. In addition, the light beam emitted by the locator 10 can be used to get a general idea of vertical alignment if the locator is suspended from a flexible line so that it points straight down.

A fish tape locator of the invention is used for fishing through a wall or other space through which wires or other items are to be pulled by first attaching it to the end of a fish tape and turning it on. The end of the fish tape is then inserted into the space through which the fish tape is to be fished, and the person fishing it, or an assistant, goes to the destination location where the fish tape is being fished to. The illumination provided by a locator of the invention makes the fish tape end highly visible, even in dark spaces, which helps locate the end of the fish tape and determine the location of the end of the fish tape relative to the destination location.

Many modifications and variations to the preferred embodiments described will be apparent to those skilled in the art. Therefore, the invention should not be limited to the embodiments described, but should be defined by the claims which follow.

We claim:

1. An illuminated electrical wire fish tape, comprising:

a fish tape locator;

an elongated flexible tape with an end means for securing said fish tape locator to said fish tape;

said fish tape locator secured to said end means of said fish tape, said fish tape locator comprising:

a generally cylindrical housing having a first axial end and a second axial end opposite from said first axial end, said housing enclosing a power source and having mounting means for mounting an illumination source powered by said power source to emit light out said second axial end of said housing;

connecting means for rigidly fixing said first axial end of said housing to said end means to hold said housing in axial alignment with said end means;

an illumination source mounted in said housing to emit light from said second axial end of said housing; and switch means for turning on and off said illumination source.

2. A fish tape as claimed in claim 1, wherein said illumination source is an LED.

3. A fish tape as claimed in claim 1, wherein said connecting means for fixing said first axial end of said housing to said end means includes male threads for securing said locator to said fish tape.

4. A fish tape as claimed in claim 3, wherein said first end is provided with a cross-bore.

5. A fish tape as claimed in claim 4, wherein said connecting means is fixedly attached to said switch means and said switch means is threadedly connected to said housing:

whereby said illumination source emits light when said switch means is rotated.

6. A method of fishing a fish tape through a confined space through which wires are to be pulled by the fish tape to a destination location from which said wires are to be pulled, said fish tape being illuminated and having an elongated flexible tape with an end means for securing a fish tape locator to said fish tape, a fish tape locator secured to said end means of said fish tape, said fish tape locator including a generally cylindrical housing having a first axial end and a second axial end opposite from said first axial end, said housing enclosing a power source and having mounting means for mounting an illumination source powered by said power source to emit light out said second axial end of said housing, connecting means for rigidly fixing said first axial end of said housing to said end means to hold said housing in axial alignment with said end means, an illumination source mounted in said housing to emit light from said second axial end of said housing, and switch means for turning on and off said illumination source, said method comprising the steps of:

turning said illumination source on so that it emits light out of said second end of said housing;

fishing said end of said fish tape with said locator connected thereto through said confined space; and determining a location of said fish tape end relative to said destination location by observing the light emitted by said locator.

* * * * *